Jan. 9, 1962 KIMIHARU NOYORI 3,016,000
PORTABLE OCULI FUNDUS CAMERA
Filed June 19, 1958 2 Sheets-Sheet 2

INVENTOR.
KIMIHARU NOYORI
BY Leon M. Strauss AGT.

United States Patent Office 3,016,000
Patented Jan. 9, 1962

3,016,000
PORTABLE OCULI FUNDUS CAMERA
Kimiharu Noyori, Tokyo, Japan, assignor to
Yasuyuki Sata, Tokyo, Japan
Filed June 19, 1958, Ser. No. 743,204
Claims priority, application Japan June 26, 1957
1 Claim. (Cl. 95—12)

This invention relates to an oculi fundus camera provided therein with an electric flash lamp and an illuminating small electric lamp by which an oculi fundus is illuminated and photographed.

The main object of this invention is to make an oculi fundus camera of this kind portable and compact. For this object, according to this invention the camera comprises a surface mirror with a pin hole or a semitransparent mirror to be situated in the optical axis of an eye to be examined with an inclination of a certain angle, preferably 45°, to said optical axis, an observation unit arranged behind said mirror in the direction of said optical axis, and a photographing unit whose optical axis is inclined to the mirror by an angle equal to the first-mentioned angle, preferably 45°.

Another object of this invention is to obtain a portable fundus camera which enables one to perform an observation and a focus adjustment in quite different manners, with the result that one can observe a fundus very simply without damaging accommodating power of an eye to be examined. To attain this object this invention provides further a movable lens arranged in the ray path of the photographing unit, a semitransparent mirror situated in said ray path behind said movable lens with an inclination of a certain angle, preferably 45°, to the optical axis of the photographing unit, and a focusing means whose optical axis is inclined to said second mirror by an angle equal to the last mentioned angle, preferably 45°.

Other objects of the invention will appear hereinafter, the novel features and combination being set forth in the appended claim.

Figure 1:
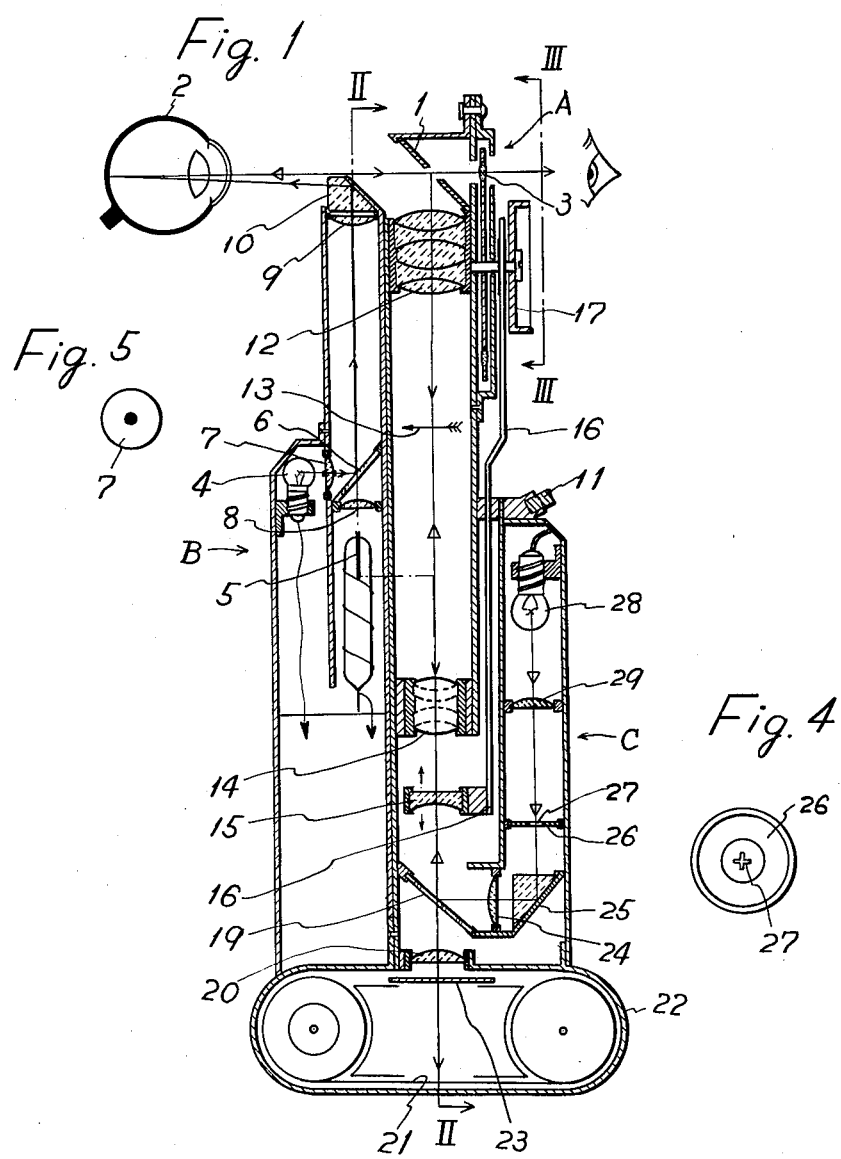
Figure 2:
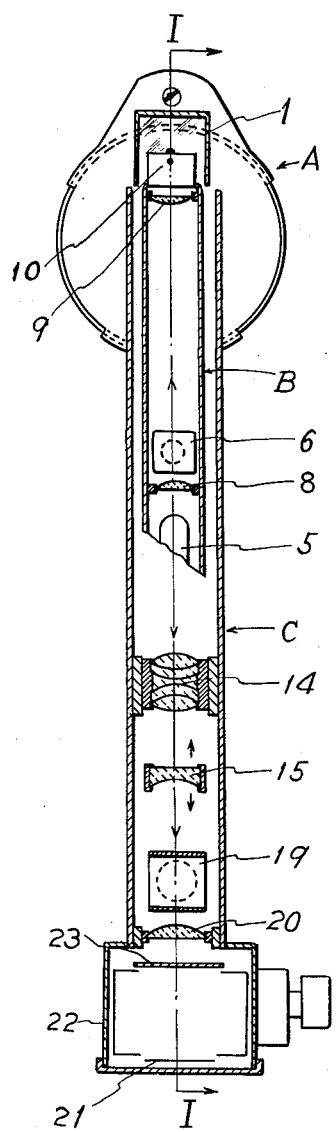
Figure 3:
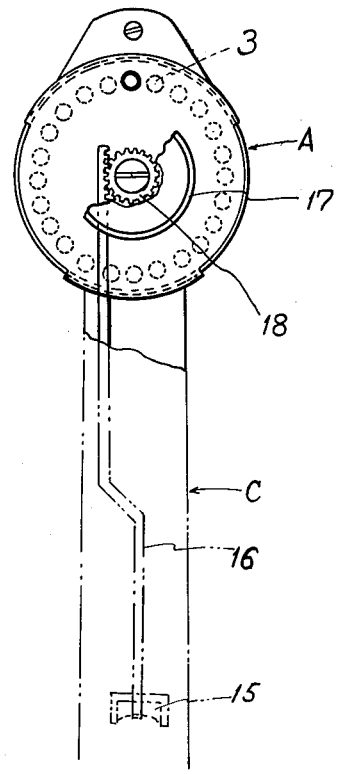

In the accompanying drawings showing one embodiment of the camera of this invention, FIG. 1 is a longitudinal sectional view of said embodiment taken on line I—I of FIG. 2, FIG. 2 is a sectional front view of the same taken on the line II—II of FIG. 1, FIG. 3 is a back view, partly cut away, of the same, looking in the direction of the arrows III—III of FIG. 1, FIG. 4 is a plan view of a focusing plate, and FIG. 5 is a plan view of a lens.

The embodiment of the present invention shown in the drawing consists substantially of an observation unit A, an illuminating unit B and a photographing unit C with a focusing means, all arranged in a suitable housing.

As shown in FIG. 1, the observation unit A includes a surface reflecting mirror with a central pin hole or a semitransparent mirror 1 to be positioned in alignment with the optical axis of an eye 2 to be examined with an inclination of 45° to said optical axis. Behind this mirror a so-called Rekos lens disk 3 is arranged, through which as well as the mirror 1 an examiner can observe the fundus of the eye 2. This Rekos disk is of a well known type used in a conventional electric ophthalmoscope and has a plurality of small lenses arranged in a circle of a disk.

The illuminating unit B includes a small electric lamp 4 as a light source for observation and an electric flash lamp 5 as a light source for photographing, positioned symmetrically to a transparent glass 6. This unit has, furthermore, condenser lenses 7, 8, 9 and a prism 10. In case of observation a ray bundle from the lamp 4 passes through the condenser 7, the transparent glass 6, the condenser 9 and the prism 10 and penetrates into the fundus from the lower half of the pupil of the eye 2 to be examined, resulting in an illumination of a certain range of the fundus. Because a black spot is printed in the center of the condenser 7 as shown in FIG. 5, a corresponding dark part is projected in the central part of the illuminating field of the fundus. This dark part is used for clearly projecting on this part a cross lines image from the photographing unit, as explained hereinafter. At the instant of photographing a switch 11 is pushed and in electric association with it the flash lamp 5 is flashed to illuminate the illuminating field intensely which is illuminated also by the lamp 4.

The photographing unit C has a first lens 12 arranged directly below the reflecting mirror 1, as shown in FIG. 1. This lens is a short focus lens corrected in all aberrations. When an eye to be examined is an enmetropic, its retina image is formed as a first one in a position shown by an arrow 13 in FIG. 1 by the reflecting mirror 1 and the first lens 12, and is to be formed then as a second image through a second lens 14. A movable concave lens 15 is arranged in the ray path of the photographing unit. This lens 15 can be moved by a shifter 16 along the optical axis of the unit freely from the outside, as shown by arrows in FIG. 1. When a hand wheel 17 is rotated, a toothed wheel 18 fixed to the wheel 17 is rotated, too, so that the shifter 16 carrying the lens 15 is moved vertically through its rack portion meshing with the wheel 18, as shown in FIG. 3. If by moving the concave lens 15 its focus on the image side coincides with the second image point of the eye 2 to be examined, the ray bundle passing through this lens 15 consists of parallel rays. Therefore, when a camera box 22 is so positioned that a film 21 in said box is situated in the focal plane on the image side of a third lens 20, the retina image of the eye 2 is formed finally on this film 21. The camera box 22 is provided with a simple shutter 23. A semi-transparent mirror 19 is interposed between the lens 15 and the third lens 20 with an inclination of 45° to the optical axis of these lenses. Furthermore, a lens 24 and a prism 25 are arranged in a line inclined by 45° to the mirror 19 and a focusing plate 26 is positioned in a line perpendicular to the last mentioned line and in the focal plane of the lens 24. The focusing plate 26 is provided with a central slot 27 of an optional figure, preferably, a cross lines, which is to be projected on the retina of the eye to be examined. The focusing plate 26 is illuminated by a small lamp 28 through a condenser 29. Because in the above-mentioned optical system the film 21 and the focusing plate 26 with the cross lines slot 27 are positioned optically conjugately with respect to the parallel rays, since the lenses 20 and 24 are equivalent when the retina image of the examined eye 2 is formed on the film 21, the cross lines slot 27 is imaged clearly on the retina of the examined eye 2 by rays passing on the entirely inverse ray path through the prism 25, the lens 24, the semitransparent mirror 19, the concave lens 15, 24, the semitransparent mirror 19, the concave lens 15, the second lens 14, the first lens 12, and the reflector 1. If the examined eye has refractive errors, the first and second image points of its retina deviate vertically from those of the retina of an enmetropic eye. In this case, when the examiner adjusts the movable lens 15 from the outside, until the image of the cross lines slot is formed clearly on the retina of the examined eye, then the fundus image of the examined eye can be photographed on the film 21.

The above mentioned camera can be operated by a single hand. When an examiner wants to operate this camera, he must light at first the small lamp 4 of the illumination unit, whereby rays penetrate into the fundus of an eye to be examined and he can observe directly the fundus through the pin hole of the mirror 1 and a lens of the Rekos lens disk 3. If the examined eye has any refractive errors, the examiner rotates the Rekos lens disk 3 with his index finger so as to be able to observe the fundus clearly, as in a well known manner of a conventional fundus examination. The examiner, then, switches on the small lamp 28 of the photographing unit in order to project the cross lines slot 27 on the fundus of the examined eye by rays passing inversely through the optical system of the photographing unit. Because in this case a dark portion is put in the center of the observing field as mentioned above, the image of the cross lines slot is observed very clearly. In accordance with refractive conditions of the examined eye, the examiner rotates with his index finger the hand wheel 17 to move the concave lens 15 through the toothed wheel 18 and the shifter 16, whereby the image of the cross lines slot is clarified sufficiently. Then the examiner pushes the switch 11 with his thumb, whereby through a mechanical gearing and an electrical connection the shutter 23 is opened and at the same time the flash lamp 5 is switched on while the small lamp 28 is switched off, with the result that the fundus is photographed.

Because this gearing and connection mentioned above may be optional and have no important relations to the present invention, explanations upon them may be dispensed with.

The concave lens 15 may be dispensed with. In this case, however, the second lens 14 is so fixed to the shifter 16, instead of the lens 15, as to be able to move vertically together with the shifter 16.

Because in the camera of the present invention one can perform an observation and focus adjustment (neutralization of refractive errors) in quite different manners, one can observe oculi fundus very simply without damaging accommodating power of an eye to be examined. Furthermore, as the illuminating unit is separate and independent in this camera, cornea reflection of a light source occurs in no wise. A clear projection of a cross lines image in this camera enables one to perform a reliable focus adjustment. The camera of the present invention, therefore, is very useful for clinical or researching purposes.

Obviously those skilled in the art may make various changes in the details and arrangement of parts without departing from the spirit and scope of the invention as defined by the claim hereto appended, and I wish therefore not to be restricted to the precise construction herein disclosed.

I claim:

A portable camera for viewing and photographing objects such as the fundus of the eye, comprising a camera having an aperture, a housing extending outwardly from said camera including wall means defining an image light reflecting passage aligned with and extending outwardly from the aperture of said camera and also defining a viewing passage extending at an angle with and intersecting said image light reflecting passage, said viewing passage including an object opening at one end for viewing an object to be illuminated and photographed, and an opening at the opposite end for positioning the eye of the operator for viewing purposes, said housing further including wall means adjacent said image light reflecting passage defining an illumination chamber, semitransparent mirror means disposed at the intersection of said viewing passage and said image light reflecting passage and positioned to both reflect the image of the object being viewed along said image light reflecting passage to said camera and to permit the passage of the image to the opposite end of said viewing passage for observation by the operator, light means in said illumination chamber including means to direct light onto the object being viewed in the vicinity of the object opening of said viewing passage, wall means defined on said housing adjacent said image light reflecting passage defining a focusing light chamber in communication with said image light reflecting passage at the end adjacent said camera, means in said focusing light passage for directing a light image into said image light reflecting passage to said viewing passage and onto said object, and a second semitransparent mirror disposed in said image light reflecting passage adjacent said camera and at the location to intercept light from said focusing light passage and reflected to said object while permitting light from the object to pass to said camera aperture.

References Cited in the file of this patent

UNITED STATES PATENTS

| | | |
|---|---|---|
| 1,633,658 | Brown | June 28, 1927 |
| 1,760,208 | Pfeiffer et al. | May 27, 1930 |
| 2,164,576 | Collins | July 4, 1939 |
| 2,257,331 | Clarke | Sept. 30, 1941 |
| 2,586,973 | McMillin | Feb. 26, 1952 |
| 2,902,911 | Noyori | Sept. 8, 1959 |

FOREIGN PATENTS

| | | |
|---|---|---|
| 546,970 | Italy | Aug. 3, 1956 |
| 647,857 | Great Britain | Dec. 20, 1950 |
| 784,371 | Great Britain | Oct. 9, 1957 |
| 729,315 | France | Apr. 25, 1932 |
| 1,129,603 | France | Sept. 10, 1956 |

OTHER REFERENCES

British Journal of Photography, Degenhardt article, vol. 103, No. 5015 (June 29, 1956), pages 309, 310.